United States Patent [19]

Adahan

[11] Patent Number: 5,592,030
[45] Date of Patent: Jan. 7, 1997

[54] POWER SUPPLY FOR ENERGIZING DC LOAD FROM AC OR DC SOURCE

[76] Inventor: Carmeli Adahan, Netivei Am 11, Ramot Gimmel, 97552 Jerusalem, Israel

[21] Appl. No.: 109,020

[22] Filed: Aug. 19, 1993

[51] Int. Cl.$^6$ .................................................... H02B 1/24
[52] U.S. Cl. ............................ 307/80; 307/128; 307/150
[58] Field of Search ................................. 307/38, 64–66, 307/72, 75, 125, 85–87, 139, 112, 150, 128, 43, 80; 320/8, 11, 28, 34, 54; 363/15, 16, 20, 21

[56] References Cited

U.S. PATENT DOCUMENTS

| | | | |
|---|---|---|---|
| 4,672,228 | 6/1987 | Swoboda | 307/66 |
| 4,835,409 | 5/1989 | Bhagwat et al. | 307/64 |
| 4,939,623 | 7/1990 | Equi et al. | 361/752 |
| 4,957,831 | 9/1990 | Meredith et al. | 307/150 |
| 5,184,025 | 2/1993 | McCurry et al. | 307/66 |
| 5,220,269 | 6/1993 | Chen et al. | 307/150 |
| 5,245,220 | 9/1993 | Lee | 307/80 |
| 5,250,767 | 10/1993 | Sammon | 200/43.08 |

*Primary Examiner*—William M. Shoop, Jr.
*Assistant Examiner*—Jonathan S. Kaplan
*Attorney, Agent, or Firm*—Benjamin J. Barish

[57] ABSTRACT

A power supply for energizing a load device such as an electrical motor of a small suction/compressor pump with DC, includes an AC socket for connection to an AC supply, a rectifier, a charging circuit for charging a storage battery, a manual switch for connecting the load device either to the rectified AC from the AC source or to the battery, and a control circuit for connecting the battery to the load device when the manual switch is closed and the AC is not connected to an AC source, and for disconnecting the battery from the load device and connecting it to the charging circuit when the AC socket is connected to an AC source and the manual switch is open.

11 Claims, 3 Drawing Sheets

POWER SUPPLY FOR ENERGIZING DC LOAD FROM AC OR DC SOURCE

FIELD AND BACKGROUND OF THE INVENTION

The present invention relates to an electrical power supply. The invention is particularly useful with respect to AC/DC power supplies for energizing relatively small load devices, such a small suction/compressor pump motors, and is therefore described below with respect to this application.

OBJECTS AND BRIEF SUMMARY OF THE INVENTION

An object of the present invention is to provide a power supply of the foregoing type having a number of advantages as will be set forth more particularly below.

According to the present invention, there is provided electrical apparatus comprising an electrical DC motor, and a power supply for supplying power to the electrical DC motor. The power supply comprises an AC socket for connection to an AC supply; rectifier means for rectifying the AC when an AC supply is connected to the AC socket, and for supplying DC voltage to the electrical DC motor; a battery compartment for receiving a rechargeable battery; a charging circuit for charging a rechargeable battery, when received within the compartment, with rectified AC from the rectifier means; a manual switch which may be manually opened or closed; and a control circuit effective: (a) when the manual switch is closed and the AC socket is not connected to an AC source, to connect the battery to the motor; (b) when the manual switch is closed and the AC socket is connected to an AC source, to connect the AC source to the motor and to disconnect the battery from the motor and from the charging circuit; and (c) when the manual switch is open and the AC socket is connected to an AC source, to connect the battery to the charging circuit.

According to another aspect of the present invention, there is provided a power supply for energizing an electrical DC motor, comprising an AC socket for connection to an AC supply, and rectifier means for rectifying the AC when the AC supply is connected to the AC socket, and for supplying DC voltage to the DC motor. The rectifier means includes a first rectifier circuit for rectifying the AC supply, a switching circuit for converting the rectified output from the first rectifier circuit to AC of a frequency higher than the AC supply, a transformer receiving the AC from the switching circuit, and a second rectifier circuit for rectifying the output of the transformer. The power supply further includes a battery compartment for receiving a rechargeable battery; a charging circuit for charging a rechargeable battery, when received within the compartment, with rectified AC from the rectifier means; a manual switch which may be manually opened or closed; and a control circuit effective: (a) when the manual switch is closed and the AC socket is not connected to an AC source, to connect the battery to the motor; (b) when the manual switch is closed and the AC socket is connected to an AC source, to connect the AC source to the motor and to disconnect the battery from the motor and from the charging circuit; and (c) when the manual switch is open and the AC socket is connected to an AC source, to connect the battery to the charging circuit. The control circuit includes a controller which controls the duty cycle of the switching circuit to regulate the output thereof in accordance with the output of the second rectifier circuit, a comparator circuit which senses the voltage applied to the load device from the AC source, and a transistor circuit controlled by the comparator circuit to disconnect the battery from the DC motor when the comparator senses the presence of a DC voltage applied to the DC motor from the AC source.

According to a further feature in the preferred embodiment of the invention described below, the control circuit regulates the charging voltage applied to the battery at a voltage level slightly higher than the DC voltage applied to the load device. The control circuit further includes a second comparator which senses the charging current applied to the battery and controls the controller to control the duty cycle of the switching circuit in response to the sensed charging current.

The described preferred embodiment of the invention further includes a DC socket connectible to a DC supply for supplying DC voltage to the load; and an electrical interlock effective to automatically disconnect the load from the DC output of the AC supply whenever the DC socket is connected to a DC supply. The DC socket is adjacent to the AC socket, and a shutter is pivotally mounted between the two sockets such as to enable the shutter to provide access to one of the sockets and at the same time to block access to the other of the sockets.

According to still further features in the described preferred embodiment, the power supply is mounted on an L-shaped printed circuit board having two right-angle legs, the battery compartment being nested in the juncture between the two legs. In addition, the power supply includes a light indicator to indicate the status of the power supply; the light indicator and the manual switch being directly mounted on the printed circuit board; the power supply being received within a housing having openings therein for receiving the light indicator and manual switch mounted on the printed circuit board.

According to still further features in the described preferred embodiment, the load device is an electrical motor, and the power supply further includes a thermal protective fuse mounted on the printed circuit board in close proximity to the electrical motor such that upon overheating the electrical motor, the fuse melts to interrupt the circuit thereto.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
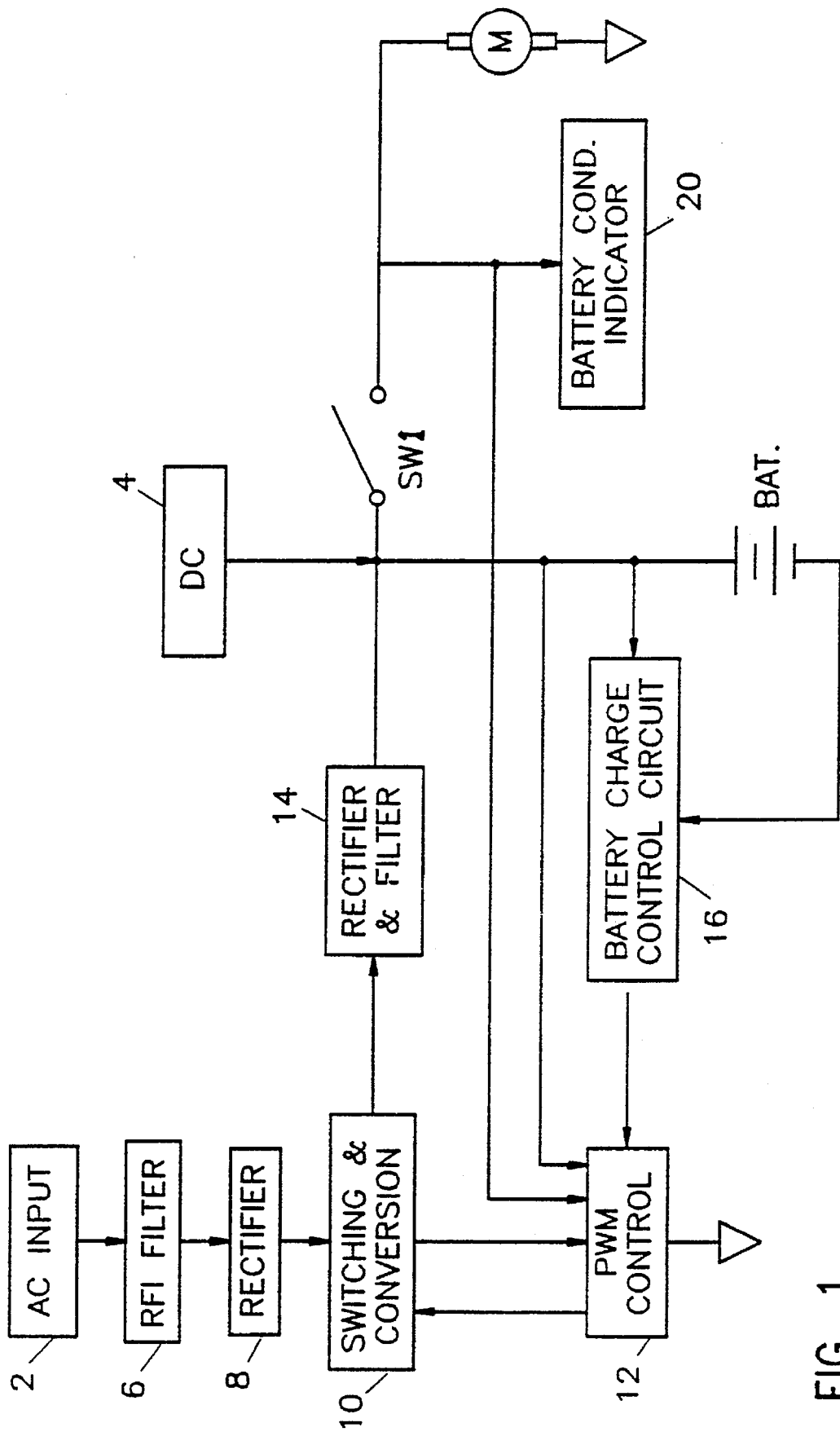
FIG. 1 is a block diagram illustrating one form of power supply constructed in accordance with the present invention.

The power supply illustrated in the drawings is particularly useful for connection to either an AC source or a DC source for supplying DC voltage to an electrical motor for driving a small suction/compressor pump. Thus, the block diagram illustrated in FIG. 1 shows the motor M as being supplied either via an AC input connector 2 or a DC input connector 4. When supplied via the AC input connector 2, the AC is passed through an RFI (radio frequency interference) filter circuit 6, and a rectifier 8 to a switching and conversion circuit 10. The latter circuit is controlled by a control circuit 12 so as to provide, to a second rectifier circuit 14, an AC output of a frequency higher than the AC input 2 and having a duty cycle controlled by the control circuit 12. The second rectifier circuit 14 applies DC voltage to the electrical motor M via a manual switch SW1.

The circuit illustrated in FIG. I further includes a rechargeable battery BAT which is selectively charged from the second rectifier 14 under the control of a battery charging circuit 16. The arrangement is such that the battery is connected to the electric motor M when the manual switch SW1 is closed and the AC input 2 is not connected to the circuit, whereas the battery is disconnected from the electric motor M and is connected to the second rectifier circuit 14, so as to be charged thereby, when the AC input 2 is connected to the circuit and the manual switch SW1 is open. An indicator circuit 20 indicates the condition of the battery BAT.

Figure 4A:
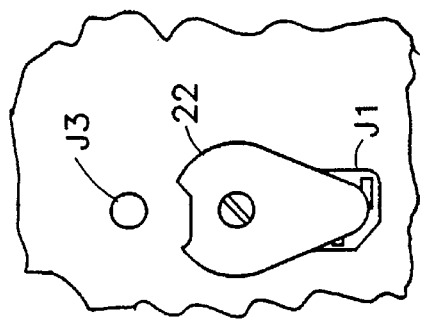
FIG. 4a is a fragmentary view of FIG. 4 illustrating a second position of a protective shutter mounted on the housing.

The DC input 4 to the circuit illustrated in FIG. 1 is also controlled by the manual switch SW1. As will be described more particularly below with respect to FIG. 2, the electrical circuit includes an electrical interlock effective to automatically disconnect the electrical motor M from the second rectifier circuit 14 whenever the DC source 4 is connected to the circuit. The circuit also includes a mechanical interlock, in the form of a protective shutter as will be described more particularly below with respect to FIGS. 4 and 4a, which is effective to permit only the AC input connector 2 or the DC input connector 4 to be accessible for connection to the circuit at any one time.

Figure 2:
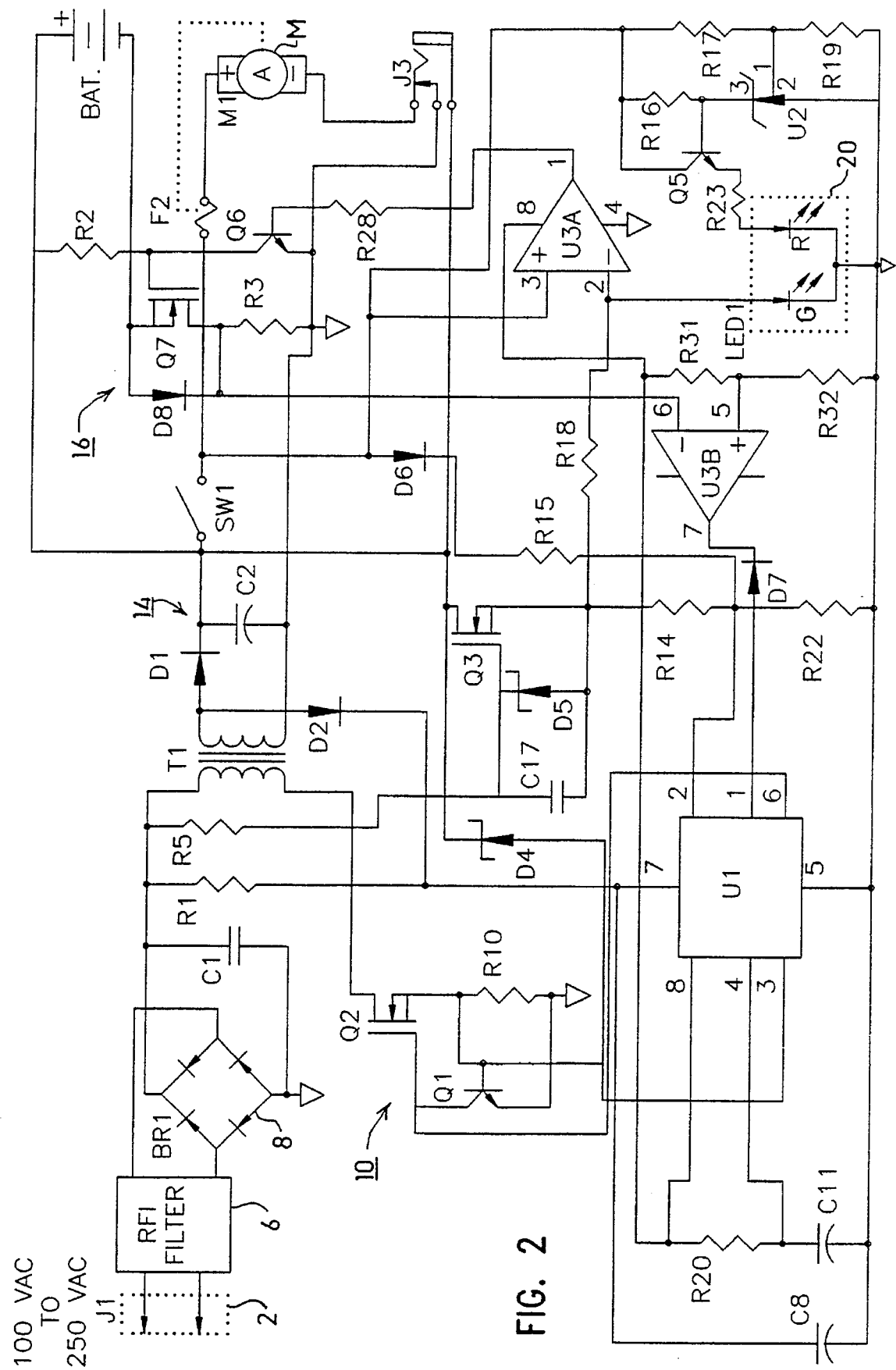
FIG. 2 is an electrical circuit diagram more particularly illustrating the construction of one form of power supply in accordance with the present invention.

FIG. 2 is a circuit diagram more completely illustrating the construction of the circuit schematically shown in FIG. 1, particularly the construction of the elements within blocks 10, 12, 14, 16 and 20 in FIG. 1.

As shown in FIG. 2, the AC input connector 2 is in the form of an AC socket J1 connectible to an AC supply, such as the household AC mains supplying 110 or 220 volts AC at 50 or 60 Hz. The AC input is applied first to a filter RFI (radio frequency interference), corresponding to filter 6 in FIG. 1, and then to a bridge rectifier BR1, corresponding to rectifier 8 in FIG. 1, having an output which is smoothed by a capacitor C1. For economy purposes, capacitor C1 is small so that it does not completely smoothen the voltage ripple from the rectifier. Also, capacitor C1 has a very low impedance so that it allows high current switching without introducing significant impedance losses.

The switching and conversion circuit 10 illustrated in FIG. 1 includes a flyback transformer T1 in FIG. 2 whose primary winding is controlled by a switching circuit including transistors Q1 and Q2. Transistor Q2 converts the output from rectifier 8 to AC of a frequency substantially higher than that of the AC supply (e.g., 250 KHz) which is applied to the primary of transformer T1. Transistor Q1, in combination with resistor R10, provides current limiting and short circuit protection for transformer T1; thus, if the current through resistor R10 is excessive, the voltage across it exceeds the base voltage for transistor Q1 turning it on, and in turn connecting the gate drive of transistor Q2 to ground to thereby interrupt the current conducted through transistor Q2.

Transistor Q2 is controlled by a PWM (pulse width modulation) controller U1 to switch the primary winding of transformer T1 at a predetermined frequency (e.g., 250 KHz), but for a duty cycle (i.e., the ratio between the on time and off time of transistor Q2 during each cycle) controlled by the PWM controller U1. The output of the secondary winding of transformer T1 is thus controlled by controller U1.

Transformer T1 operates in the "flyback" mode. Thus, when transistor Q2 is turned on, transformer T1 stores the energy, and when transistor Q2 is turned off, the energy is discharged through the diode D1 to an output capacitor C2. This output applied to capacitor C2 is utilized for energizing motor M, or for charging the battery BAT.

The current through transistor Q2 is controlled by controller U1 via its input terminal 3 which is connected to the juncture of resistor R10 and the base of transistor Q1, to thereby control the duty cycle of transistor Q2 to limit the current and to provide short circuit protection for transformer T1.

The circuit illustrated in FIG. 2 further includes means for isolating the battery BAT when the circuit is connected to an AC supply via its AC socket J1, and manual switch SW1 is turned on to energize the electrical motor M. This is accomplished by a comparator U3a which senses a high voltage on the + terminal of the electrical motor M, such that when this terminal goes positive, a transistor Q6 is turned on. This in turn turns off a transistor Q7, thereby opening the negative terminal of the battery BAT so that the battery is unable to discharge.

The battery BAT is charged to a higher voltage than that supplied to the motor M by the AC power supply. Thus, the AC power supply supplies motor M with 12.5 volts, but battery BAT is charged to 13.7 volts. The foregoing arrangement, isolating the battery BAT when the manual switch SW1 is turned on and the circuit is connected to the AC supply via AC socket J1 to energize the motor M, thus prevents the discharging of the battery in view of its higher voltage, and also prevents overtaxing of the switching power supply by having it drive the motor as well as charge the battery.

Diode D8 routes the charging current to resistor R3 and thereby allows the battery BAT to charge even when transistor Q7 is turned off. Resistor R3 is a current sensing resistor. It controls the battery charging current to prevent battery damage or over-demand of the switching power supply. This is accomplished by comparator U3b. This comparator is normally referenced to a voltage pre-set by resistors R31 and R32. When the current charging the battery BAT exceeds the pre-set limit, the voltage across resistor R3, introduced at terminal 6 of comparator U3b, causes the comparator output 7 to go negative. This output of the comparator is applied via diode D7 to terminal 1 of controller U1, which causes the controller to reduce the duty cycle of transistor Q2 to the transformer T1, thereby reducing the current through the transformer.

The battery BAT will not be charged when the manual switch SW1 is closed and the AC power supply is driving the motor M. This operation is accomplished by dropping the voltage present at capacitor C2 from 13.7 volts, which is the voltage necessary to charge the battery BAT, to 12.5 volts, which is the voltage for driving the motor M both when powered by the battery BAT, or by the AC power supply when AC is voltage is present at the AC socket 2. When the manual switch SW1 is turned off, and there is no AC power supplied from the AC socket J1, no power is supplied to terminal 8 of comparator U3a, so that its output terminal 1 is at ground level. This keeps transistor Q6 turned off and allows the battery voltage at the + terminal of battery BAT to turn on transistor Q7 via resistor R2.

The illustrated circuit further includes a two-color light indicator LED1. Indicator LED1 is energized to display a green color via transistor Q3, diode D5 and resistor R18, when power is being supplied to the motor M or to the battery BAT. However, when the motor is operated from the battery BAT, and the battery is low, indicator LED1 is energized to display a red color. This is accomplished by transistor Q5 which is controlled by reference device U2. Thus, resistors R17 and R19 provide a predetermined reference voltage at terminal I of reference device U2 such that the reference device conducts all the current from resistor R16 to ground. However, a drop in the voltage of battery BAT below the predetermined level, while the manual switch SW1 is turned on, lowers the voltage at terminal I of reference device U2, rendering it non-conductive, such that all the current through resistor R16 is then applied to the base of transistor Q5 causing it to conduct. This energizes LED1 via resistor R23 to cause LED1 to display the red color, thereby indicating a low battery condition.

The PWM controller U1 controls the duty cycle of transistor Q2 to maintain an output voltage of 13.7 volts at the positive terminal of the battery BAT to effect charging of the battery. This voltage is fed back to terminal 2 of the PWM controller U1 via transistor Q3 and resistors R14 and R22, which provide the proper feedback voltage to the internal comparator of the PWM controller. Any rise of voltage at terminal 2 of controller U1 will result in its reducing the duty cycle of the driver transistor Q2 to maintain a fixed reference.

When switch SW1 is closed and the motor M1 is energized, it is desirable to have the motor driven by 12.5 volts, and not the 13.7 volts used for charging the battery BAT. The reason for this is to avoid excessive power usage resulting from both charging the battery and energizing the motor; another reason is to have the motor driven at the same voltage when operated from a battery or from the AC power source in order to produce consistent output. This is accomplished by providing an additional feedback route from the motor M1, via diode D6 and resistor R15 to terminal 2 of the PWM controller U1. This feedback voltage at terminal 2 is thus higher for 13.7 volts, and the U1 controller drive transistor Q2 so as to maintain 12.5 volts at the positive terminal of the motor M1.

Capacitor C11 and resistor R20, connected respectively to terminals 4 and 8 of controller U1, control the frequency of an internal oscillator, and thereby the switching power supply frequency.

Input terminal 7 to controller U1 is connected via resistor R1 to the output of bridge rectifier BR1; and input terminal 5 of the controller is connected to the same circuit via capacitor C8. When no power is introduced via the AC socket J1, transistor Q3 completely isolates the battery BAT to prevent battery discharge. Resistor R1 allows for charging capacitor C8 until the voltage of the capacitor is sufficient for the controller U1 to operate. When this occurs, controller U1 is supplied from the transformer T1 output through diode D2 connected to input terminal 7 of the controller.

The electrical circuit illustrated in FIG. 2 further includes a thermal protective fuse F2 mounted on the reverse side of the printed circuit board, i.e., opposite to the side carrying the electrical components illustrated in FIG. 2. Fuse F2 is located so as to be in proximity to the motor M in order to enable it to sense the motor temperature. The fuse thus provides protection for motor overheating, or for a locked rotor, in a very simple and low cost manner as compared to the techniques commonly used for providing this protection, to disconnect the motor from the power supply in case of an excessive temperature rise in the motor.

When the power supply is connected to a DC source 4, the plug applying the DC power is received within DC socket J3. This disconnects the ground lead of the entire circuit, so that closing the manual switch SW1 will power the motor M from the power available only at the DC socket J3. The illustrated arrangement thus produces an electrical interlock effective to automatically disconnect the motor M from the AC socket J1 whenever the DC socket J3 is connected to a DC supply.

In addition to the above electrical interlock protection, the described device also includes mechanical protection against connecting both the AC socket J1 and the DC socket J3 at the same time to a power supply. Thus, the two sockets J1 and J3 are mounted in close proximity to each other at the rear side of the housing 20 for the power supply. Pivotally mounted between the two sockets J1 and J3 is a protective shutter 22 which can be pivotted to one position making only one socket accessible, or to a second position making only the other socket accessible. Thus, when shutter 22 is pivotted to the position illustrated in FIG. 4, it makes the AC socket J1 accessible and blocks the DC socket J3; but when pivotted to the position illustrated in FIG. 4a, it makes the DC socket J3 accessible and blocks access to the AC socket J1.

Figure 4:
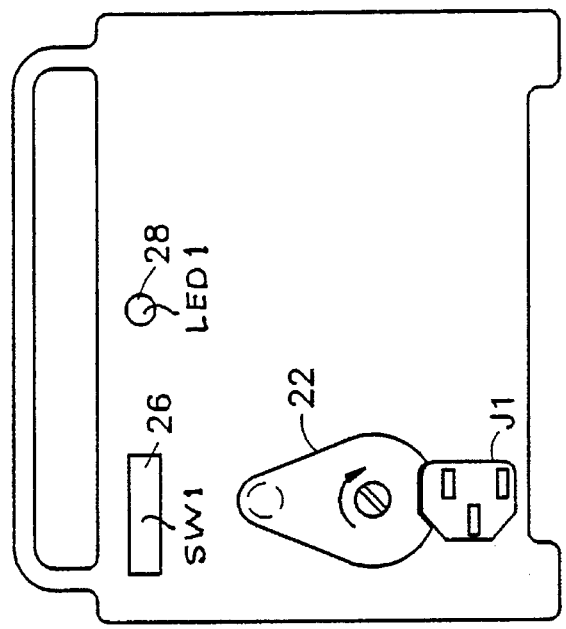
FIG. 4 is an elevational view illustrating the rear side of the housing of FIG. 3.
Figure 3:
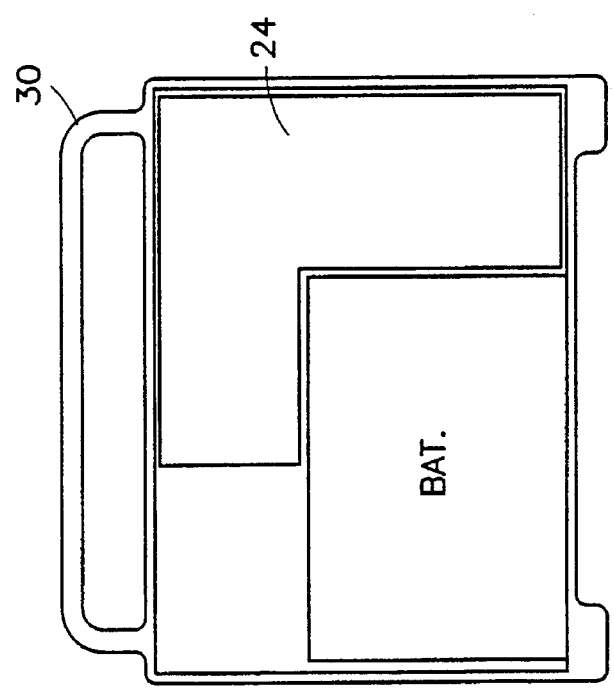
FIG. 3 diagrammatically illustrates the packaging of the power supply within a small portable housing for use with a portable compressor or suction pump.

All the above-described electrical components shown in FIG. 2 of the drawings, except for the battery BAT, are mounted on an L-shaped printed circuit board 24 (FIG. 3), which snuggly fits within the housing 20. The two sockets J1, J3 are directly mounted to the printed circuit board and project through openings in the housing 20, as shown in FIG. 4. In addition, the manual switch SW1 is also directly mounted to the printed circuit board and projects through an opening 26; similarly, the light indicator LED1 is mounted directly to the printed circuit board and projects through an opening 28 formed in the housing 20. As shown in FIG. 3, the battery compartment 30 is of rectangular configuration and is nested into the juncture of the two right-angle legs of the L-shaped printed circuit board 24. Such an arrangement provides a very compact package. It also exploits the electrical components for mounting the printed circuit board to the housing, thereby obviating the need for extra mounting hardware.

It will thus be seen that the above-described power supply is effective: (a) when the manual switch is closed and the AC socket is not connected to an AC source, to connect the battery to the motor; (b) when the manual switch is closed and the AC socket is connected to an AC source, to connect the AC source to the motor and to disconnect the battery from the motor and from the charging circuit; and (c) when the manual switch is open and the AC socket is connected to an AC source, to connect the battery to the charging circuit.

It will also be seen that the above-described power supply provides a number of important advantages, including the following:

1. It provides a fixed DC voltage (12 volts) when connected to any AC supply mains, between 90 and 250 volts, and a slightly higher voltage (13.7 volts DC) for charging the battery BAT (e.g., a lead acid battery);
2. It controls the battery charging voltage and current, and it does not charge the battery when the electrical motor is operated from the AC supply;

3. It lowers the supply voltage from (13.7 volts to 12.5 volts) when the electric motor is running on the AC supply, thereby enabling the motor to operate at the same power level and voltage when operated either on an external AC supply or on the internal battery;
4. It provides a two-color light indicator (LED1) to indicate the condition of the device, and also to indicate a low battery condition;
5. It automatically disconnects the battery when the motor is being run on the AC supply mains, to prevent draining the battery when it is completely charged;
6. It permits connecting the device to a DC supply, via the DC socket J3 (e.g., connected to an automobile cigarette lighter or the like) without the risk of voltage spikes causing damage to the internal supply electronic circuit, this being accomplished by providing a complete disconnection of the electronic circuit when the DC socket is connected to a DC supply;
7. Its pivotal shutter 22 prevents connecting the DC socket J3 to a DC supply when the AC socket J1 is connected to an AC supply, thereby blocking access to the internal circuitry, and preventing the possibility of an electrical shock when the AC socket is connected to the AC supply;
8. Its thermal protective fuse F2, mounted on the printed circuit board so as to be located in proximity to the electric motor M, prevents an excessive temperature rise in the motor;
9. Its RFI filter 6 at the AC inlet prevents transmission of electromagnetic interference signals;
10. Its mounting of the manual switch SW1, the two sockets J1 and J3, and the indicator lamp LED1 directly to the printed circuit board enables using these elements also for mounting the printed circuit board to the housing, and thereby provides a compact and simpler construction which obviates the need for extra electrical wiring and mounting hardware; and
11. Its printed circuit board of L-shape and nested with the battery compartment further increases the compactness of the overall design.

All the foregoing advantages make the described device particularly suitable for small, portable suction/compressor pumps.

While the invention has been described with respect to one preferred embodiment, it will be appreciated that this is set forth merely for purposes of example, and that many other variations, modifications and applications of the invention may be made.

What is claimed is:

1. A power supply for energizing an electrical DC motor, comprising:
   an AC socket for receiving a plug to be connected to an AC source;
   rectifier means for rectifying the AC when the AC source is connected to the AC socket, and for supplying DC voltage to the DC motor, said rectifier means including a first rectifier circuit for rectifying the AC of the AC source, a switching circuit for converting the rectified output from the first rectifier circuit to AC of a frequency higher than the AC source, a transformer receiving the AC from said switching circuit, and a second rectifier circuit for rectifying the output of said transformer;
   a battery compartment for receiving a rechargeable battery;
   a charging circuit for charging a rechargeable battery, when received within said compartment, with rectified AC from said rectifier means; a manual switch connected to the rectifier means, the DC motor, and the battery, wherein said manual switch may be manually opened or closed;
   and a control circuit effective:
   (a) when the manual switch is closed and the AC socket is not connected to an AC source, to connect the battery to the motor;
   (b) when the manual switch is closed and the AC socket is connected to an AC source, to connect the AC source to the motor and to disconnect the battery from the motor and from said charging circuit; and
   (c) when the manual switch is open and the AC socket is connected to an AC source, to connect the battery to said charging circuit;
   said control circuit including a controller which controls the duty cycle of said switching circuit to regulate the output thereof in accordance with the output of said second rectifier circuit, a comparator circuit which senses the voltage applied to the load device from the AC source, and a transistor circuit controlled by said comparator circuit to disconnect the battery from the DC motor when the comparator senses the presence of a DC voltage applied to the DC motor from the AC source.

2. The power supply according to claim 1, wherein said control circuit includes means for regulating the charging voltage applied to the battery at a voltage level slightly higher than the DC voltage applied to the DC motor.

3. A power supply for energizing a DC motor with DC, comprising:
   an AC socket for receiving a plug to be connected to an AC source;
   rectifier means for rectifying the AC, when an AC source is connected to the AC socket, and for supplying DC voltage to the DC motor;
   a battery compartment for receiving a rechargeable battery;
   a charging circuit for charging a rechargeable battery, when received within said compartment, with rectified AC from said rectifier means; a manual switch connected to the rectifier means, the DC motor, and the battery, wherein said manual switch may be manually opened or closed;
   and a control circuit effective:
   (a) when the manual switch is closed and the AC socket is not connected to an AC source, to connect the battery to the motor;
   (b) when the manual switch is closed and the AC socket is connected to an AC source, to connect the AC source to the motor and to disconnect the battery from the motor and from
   (b) when the manual switch is closed and the AC socket is connected to an AC source, to connect the AC source to the motor and to disconnect the battery from the motor and from said charging circuit; and
   (c) when the manual switch is open and the AC socket is connected to an AC source, to connect the battery to said charging circuit.

4. The power supply according to claim 3, wherein the power supply further includes a light indicator to indicate the status of the power supply; said light indicator and said manual switch being directly mounted on said printed circuit board; said power supply being received within a housing having openings therein for receiving the light indicator and manual switch mounted on the printed circuit board.

5. The power supply according to claim 3, wherein said control circuit includes means for regulating the charging voltage applied to the battery at a voltage level slightly higher than the DC voltage applied to the DC motor.

6. Electrical apparatus comprising:

an electrical DC motor;

and a power supply for supplying power to said electrical DC motor; said power supply comprising:
   an AC socket for connection to an AC supply;
   rectifier means for rectifying the AC when an AC supply is connected to the AC socket, and for supplying DC voltage to the electrical DC motor;
a battery compartment for receiving a rechargeable battery;
a charging circuit for charging a rechargeable battery, when received within said compartment, with rectified AC from said rectifier means;
a manual switch which may be manually opened or closed;
and a control circuit effective:
   (a) when the manual switch is closed and the AC socket is not connected to an AC source, to connect the battery to the motor;
   (b) when the manual switch is closed and the AC socket is connected to an AC source, to connect the AC source to the motor and to disconnect the battery from the motor and from said charging circuit; and
   (c) when the manual switch is open and the AC socket is connected to an AC source, to connect the battery to said charging circuit.

7. The power supply according to claim 6, wherein said rectifier means includes: a first rectifier circuit for rectifying the AC supply, a switching circuit for converting the rectified output from the first rectifier circuit to AC of a frequency higher than the AC supply, a transformer receiving the AC from said switching circuit, and a second rectifier circuit for rectifying the output of said transformer.

8. The power supply according to claim 7, wherein said control circuit includes a controller which controls the duty cycle of said switching circuit to regulate the output thereof in accordance with the output of said second rectifier circuit.

9. The power supply according to claim 8, wherein said control circuit includes a first comparator circuit which senses the voltage applied to the DC motor from the AC source, and a transistor circuit controlled by said first comparator circuit to disconnect the battery from the DC motor when the comparator senses the presence of a DC voltage applied to the DC motor from the AC source.

10. The power supply according to claim 9, wherein said control circuit includes a further comparator which senses the charging current applied to the battery and controls the controller to control the duty cycle of said switching circuit in response to the sensed charging current.

11. The electrical apparatus according to claim 6, wherein said control system includes means for regulating the charging voltage applied to the battery at a voltage level slightly higher that the DC voltage applied to said electrical motor.

* * * * *